(12) United States Patent
Tsai et al.

(10) Patent No.: US 10,200,190 B2
(45) Date of Patent: Feb. 5, 2019

(54) DATA RECOVERY USING EDGE DETECTION

(71) Applicant: Apple Inc., Cupertino, CA (US)

(72) Inventors: Hsiao-Ping Tsai, San Jose, CA (US); William P. Cornelius, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/614,613

(22) Filed: Jun. 6, 2017

(65) Prior Publication Data

US 2017/0353291 A1    Dec. 7, 2017

Related U.S. Application Data

(60) Provisional application No. 62/346,525, filed on Jun. 6, 2016.

(51) Int. Cl.
*H04L 7/033* (2006.01)

(52) U.S. Cl.
CPC .................. *H04L 7/0338* (2013.01)

(58) Field of Classification Search
CPC .............................. H04L 7/0338; H04L 1/004
See application file for complete search history.

(56) References Cited

U.S. PATENT DOCUMENTS

| | | | |
|---|---|---|---|
| 2003/0204343 A1* | 10/2003 | Yamamoto | G06F 17/5018 702/65 |
| 2010/0061505 A1* | 3/2010 | Wegener | A61B 6/032 378/19 |
| 2012/0093273 A1* | 4/2012 | Chen | H04L 7/0338 375/355 |
| 2017/0093165 A1* | 3/2017 | Liao | H02J 5/00 |

* cited by examiner

*Primary Examiner* — Vineeta S Panwalkar
(74) *Attorney, Agent, or Firm* — Kilpatrick Townsend & Stockton, LLP

(57) ABSTRACT

Circuits, methods, and apparatus that may reconstruct a data signal in the presence of ground drift and high-frequency signal coupling. An illustrative embodiment of the present invention may reconstruct a received data signal by taking an finite difference of the received data signal, detecting edges of the received data signal by detecting positive and negative peaks of the finite difference of the received signal, and reconstructing the received data signal using the detected edges. Taking a finite difference of the received data signal removes the DC component of the received data signal, as well as the ground drift that may cause the DC component of the received data signal to change over time. Additional filtering may be used to reduce high-frequency signal coupling and power supply inductive coupling.

19 Claims, 17 Drawing Sheets

DATA RECOVERY USING EDGE DETECTION

CROSS-REFERENCES TO RELATED APPLICATIONS

This application claims the benefit of U.S. provisional patent application No. 62/346,525, filed Jun. 6, 2016, which is incorporated by reference.

BACKGROUND

Universal Serial Bus (USB) compatible devices have become ubiquitous the past several years. Portable and desktop computers may include several USB ports or connectors. Other connectors, such as the Lightning™ connector, may include USB functionality. USB type C connectors are the latest to be developed and can now be found on many devices.

USB type C connectors may include rotatable connector inserts which may be plugged into a corresponding connector receptacle in either of two orientations 180 degrees apart. To detect which orientation has been used, a USB type C connector receptacle may include two connection detect pins, referred to as CC1 and CC2 pins. After a connection between devices is made using a cable, one of the CC pins may be used by a connector receptacle to provide power to a dongle or active cable. This pin may be referred to as a VCONN pin. The remaining CC pin may be used to detect a connection and its orientation and as a signaling path between devices, and may be referred to here as a CC signaling pin.

For example, connector receptacles on communicating devices may each include two CC connection detect pins. Connector inserts on a cable may each include one connection detection pin that are connected together by a conductor in the cable. In this way, a connection detection pin on one device may connect to one connection detection pin on a second device. This connection detection may then be used to determine that a connection between communicating devices has been made, and which of the communicating devices may provide power and which may receive power. This connection may then be used as a signaling pin to transfer data between the devices. Signals on this pin may be relatively low-speed, single-ended data signals. The remaining connection detection pins, the VCONN pins on the connector receptacles, may be used to provide power to connector inserts for dongles and active cables.

Several factors may hinder data transmission over the CC connection detection pins used as signaling pins. For example, a device may either provide power or receive power over a VBUS line. Depending on whether the device provides or receives power, a ground drop at a receiver may shift or drift many hundreds of millivolts in opposite directions. Also, the power provided may start, stop, or change at various times, thereby changing the amount of ground shift or drift over time. This may render a simple bits-slice data receiver to be severely error-prone and non-functional in extreme cases. Also, high-frequency coupling from other signals on the connector, such as USB2 signals, may inject high-frequency noise on a signal being received at a CC signaling pin. Inductive coupling from other conductors, such as the VBUS power supply, may further degrade a received signal. These factors may complicate data reception at a CC signaling pin.

Thus, what is needed are circuits, methods, and apparatus that may reconstruct a data signal in the presence of ground drift, high-frequency signal coupling from other signals, and inductive coupling from power supplies and other signals.

SUMMARY

Accordingly, embodiments of the present invention may provide circuits, methods, and apparatus that may reconstruct a data signal, such as a single-ended data signal, in the presence of ground drift, high-frequency signal coupling from other signals, and inductive coupling from power supplies and other signals. An illustrative embodiment of the present invention may reconstruct a received data signal by taking a finite difference of the received data signal, detecting edges of the received data signal by detecting positive and negative peaks of the finite difference of the received signal, and reconstructing the received data signal using the detected edges. Taking a finite difference of the received data signal may remove the DC component of the received data signal due to ground drift, as well as the high frequency coupling noise from USB2 or other signals. In a finite-difference method, a difference in signal values at two time points is found and divided by the difference in time between the two time points.

In one illustrative embodiment of the present invention, a finite difference of a received data signal may be generated using a processing circuit. A received data signal may be received by the processing circuit and filtered using a low-pass filter. This filtering may be used to reduce signal cross-talk from USB2 signals or other signals on or associated with a cable conveying the received data signal. A sampler circuit may follow the low-pass filter. The sampler circuit may sample and retain values of the output of the low-pass filter. A finite-difference circuit may follow the sampler circuit. The finite-difference circuit may take a difference between sampled signal values. An output of the finite-difference circuit may be the finite difference of the received data signal. One or more of these circuits may be digital circuits, though in other embodiments of the present invention, one or more of these circuits may be analog circuits.

In another illustrative embodiment of the present invention, an finite difference of a received data signal may be generated using a processing circuit. A received data signal may be received by the processing circuit and filtered using a first low-pass filter. This filtering may be used to reduce signal cross-talk from USB2 signals or other signals on or associated with a cable conveying the received data signal. An output of the first low-pass filter may be filtered using a second low-pass filter. The second low-pass filter may further reduce any cross-talk noise. In these and other embodiments of the present invention, a delay circuit may be used in place of the second low-pass filter. A subtraction circuit may take a difference between the output of the first low-pass filter and the second low-pass filter. An output of the subtraction circuit may be the finite difference of a received data signal. One or more of these circuits may be digital circuits, though in other embodiments of the present invention, one or more of these circuits may be analog circuits.

Edges of the received data signal may be detected by detecting positive and negative peaks of the finite difference of the received data signal. This may be done by detecting when the finite difference of the received signal exceeds a first threshold or falls below a second threshold. For example, a first comparator may be used to detect when an output of the processing circuit exceeds a first threshold voltage and a second comparator may be used to detect when an output of the processing circuit falls below a second threshold voltage. A rising edge of the received data signal may be recovered by the first comparator when the finite difference of the received signal exceeds the first threshold and a falling edge of the received data signal may be recovered by the second comparator when the finite difference of the received signal falls below the second threshold.

These edges may be used to recover the received data signal. For example, a detected rising edge may be used to toggle a Set-Reset (RS) flip-flop to the set (1) state, while a detected falling edge may be used to toggle the RS flip-flop to the reset (0) state.

In these and other embodiments of the present invention, a phase-locked loop (PLL), delay-locked loop (DLL) or other circuit may be used to clean-up the recovered data signal to improve the accuracy of its decoding. These circuits may be used to reduce noise associated with the locations of the edges of the recovered data signal. This clean-up may be facilitated by the use of a preamble of bits having alternating polarities. In various embodiments of the present invention, this preamble may be approximately 64 bits long. This clean-up of the data may also be facilitated by the nature of Manchester or bi-phase marked coding. Specifically, these protocols utilize edges on every bit boundary, where a one has an additional edge in the bit center while a zero does not have such an additional edge. This means data can be recovered from the logic ones and zeros from the edge information by leveraging known phase and frequency of the bit rate, and that this recovery may be further facilitated by the relatively high number of data transitions in the implemented coding scheme.

One or more of the various parameters may be programmable. For example, the threshold voltages used in recovering edges may be programmable. The bandwidths of the various filters used may be programmable. The delay of a delay circuit that may be used in place of one of the filters may be programmable. The sampling rates and time differences used may be programmable.

Various types of data may be recovered using embodiments of the present invention. For example, Manchester or bi-phase marked coding (BMC) encoded data and other types of data may be recovered using embodiments of the present invention.

Receivers and other circuits consistent with embodiments of the present invention may be utilized in various devices and components. For example, an electronic device that may provide or receive power may include an embodiment of the present invention. A receiver may be located in an electronic device and may be connected to receive a signal on the CC signaling pin. The receiver may recover data according to an embodiment of the present invention. These and other embodiments of the present invention may be located in a cable connector insert or elsewhere in a cable.

Embodiments of the present invention may provide data recovery circuits that may be used in various types of devices, such as lighting, portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. These receivers may enable the use of longer routing paths that may be useful for smoke alarms, routers, sensors, cameras, and other applications. These receivers may be used with connector receptacles that may provide pathways for signals and power compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
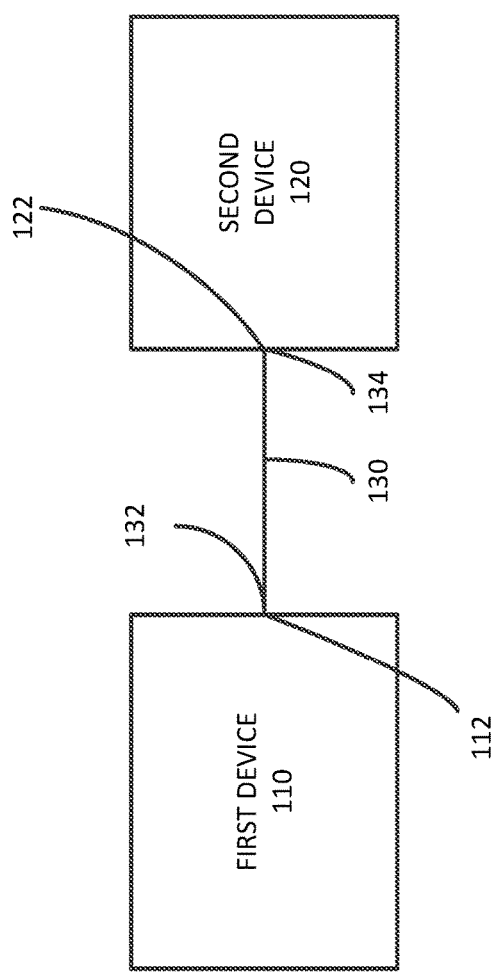
FIG. 1 illustrates an electronic system that may be improved by the incorporation of an embodiment of the present invention.

FIG. 1 illustrates an electronic system that may be improved by the incorporation of an embodiment of the present invention. In this example, a first device 110 may be in communication with a second device 120 over a cable 130. Specifically, connector inserts 132 and 134 on cable 130 may be inserted into connector receptacles 112 on first device 110 and connector receptacle 122 on second device 120. Connector receptacles 112 and 122 and connector inserts 132 and 134 may be USB type C connector receptacles and connector inserts. First device 110 and second device 120 may communicate by sending data to each other over cable 130. One of the two devices may send power to the other over cable 130 as well.

Connector inserts 132 and 134 may be rotatable. That is, connector inserts 132 and 134 may be inserted into their respective connector receptacles in one of two orientations separated by 180 degrees. In order to detect which of these orientations is used, connector receptacles 112 and 122 may each include two connection detection pins. Connector inserts 132 and 134 may each include a connection detection pin, where the two pins are electrically connected to each other by a conductor in cable 130. Using this path, the orientation of the connector insert may be determined. This path may also be used as a signaling path between first device 110 and second device 120. Since only one pin is available, the data transmission may be single ended. The remaining connection detection pin on each connector receptacle 112 and 122 and connector insert 132 and 134 may be used as a VCONN pin. This VCONN pin may be used by connector receptacles 112 and 122 to provide power to dongles and active cables 130. Relevant details of these connectors are shown in the following figure.

Figure 2:
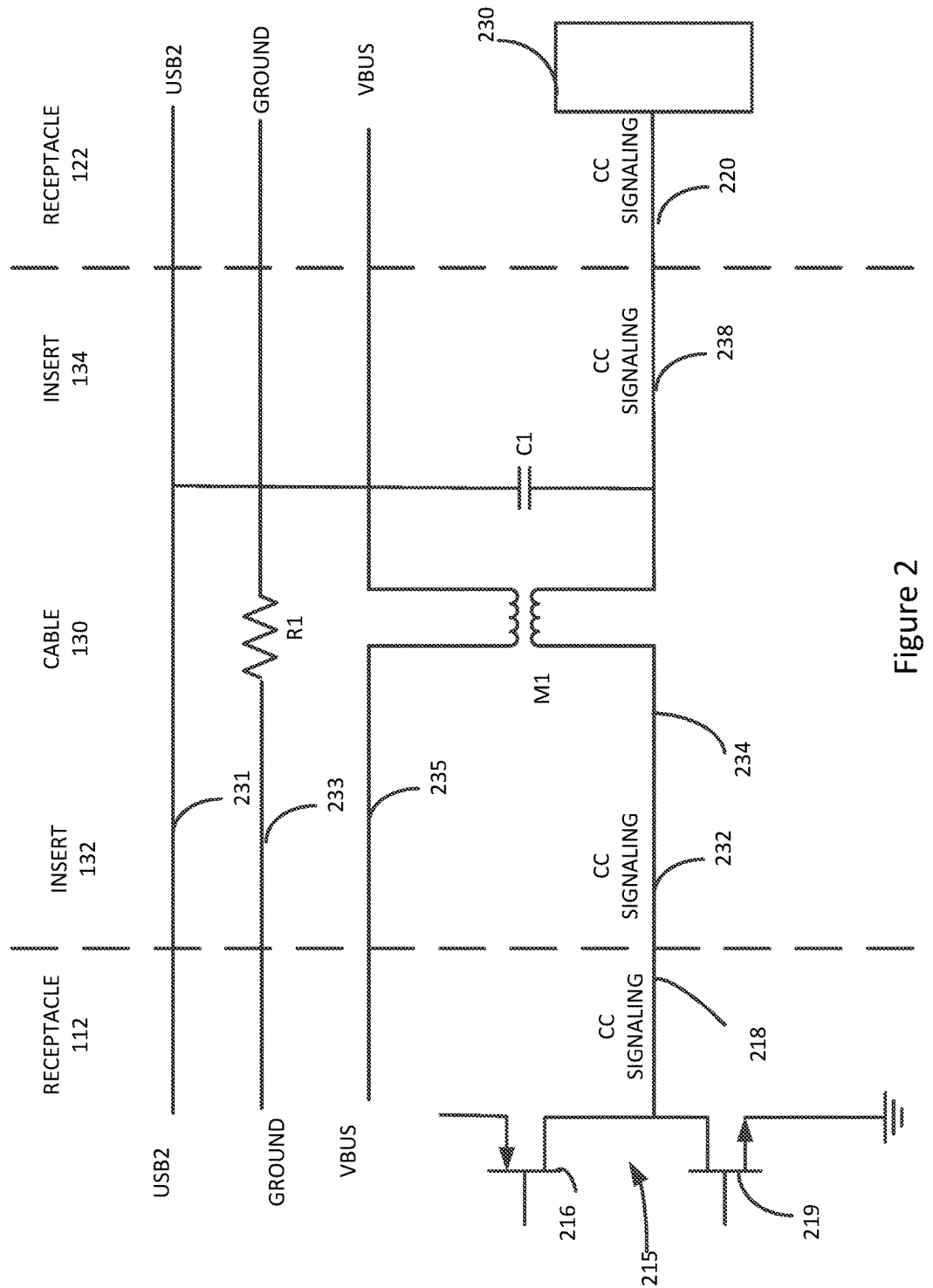
FIG. 2 illustrates portions of a data system that is improved by the incorporation of an embodiment of the present invention.

FIG. 2 illustrates portions of a data system that is improved by the incorporation of an embodiment of the present invention. In this example, connector receptacle 112 may include two connection detection pins, though only a signaling CC pin 218 is shown for simplicity. Connector receptacle 122 may also include two connection detection pins, though only one, a CC signaling pin 220, is shown here for simplicity. Cable 130 may include connection detection pins 232 and 238 in connector inserts 132 and 134, which may be electrically connected to each other through conductor 234 of cable 130.

The CC signaling pin 218 in connector insert 132 of cable 130 may be used to convey data signals. Specifically, data may be transmitted using transmitting circuitry 215, which may send data via CC signaling pins 218 in receptacle 218, pin 232 in connector insert 132, pin 238 in connector insert 134, and pin 220 in connector receptacle 122 to receive circuitry 230. Transmitting circuitry 215 may have a termination impedance of 50 ohms and may include pull-up transistor 216 and pull-down transistor 219, though other configurations may be possible. Data may also be transmitted in the reverse direction using other circuitry not shown here.

Several factors may complicate successful data transmission over the CC signaling pin. For example, high-frequency signal components from one of the other signals on or associated with the illustrated communication path may couple onto conductor 234, which conveys the CC signal. For example, USB2 signals on conductors 231 may couple to conductor 234. This coupling may be simplified as capacitor C1. In practical cables, this coupling may be T-line coupling having mutual inductive and mutual capacitive components. Also, is mentioned above, first device 110 may provide power to second device 120, or second device 120 may provide power to first device 110 using the VBUS power bus. The power drawn from the VBUS power supply may start, stop, or change at various times. This may cause appreciable changes in a current flow through cable 130. For example, current transients of 2 A/usec may result. These transients may have a duration that is on the order of one bit time for the CC signaling pin, though it may typically be shorter than an edge transition for this data. This varying current may, in turn, cause a ground shift or drift that may complicate data reception. Specifically, this current may flow through resistor R1, creating a voltage difference between the grounds of first device 110 and second device 120. Noise may inductively couple from VBUS or other power supply or signal onto conductor 234. This coupling may be illustrated by mutual inductor M. These various factors may degrade a CC data signal and make data reception more difficult and error prone.

Accordingly, embodiments of the present invention may provide circuits, methods, and apparatus may receive this single-ended data signal in the presence of ground drift, high-frequency signal coupling, and inductive coupling from power supplies and other signals. Examples are shown in figures below.

Again, a factor complicating data reception of a CC signal is a shift or drift in ground voltage as a supplied or received current changes. Examples of this effect are shown in the following figures.

Figure 3:
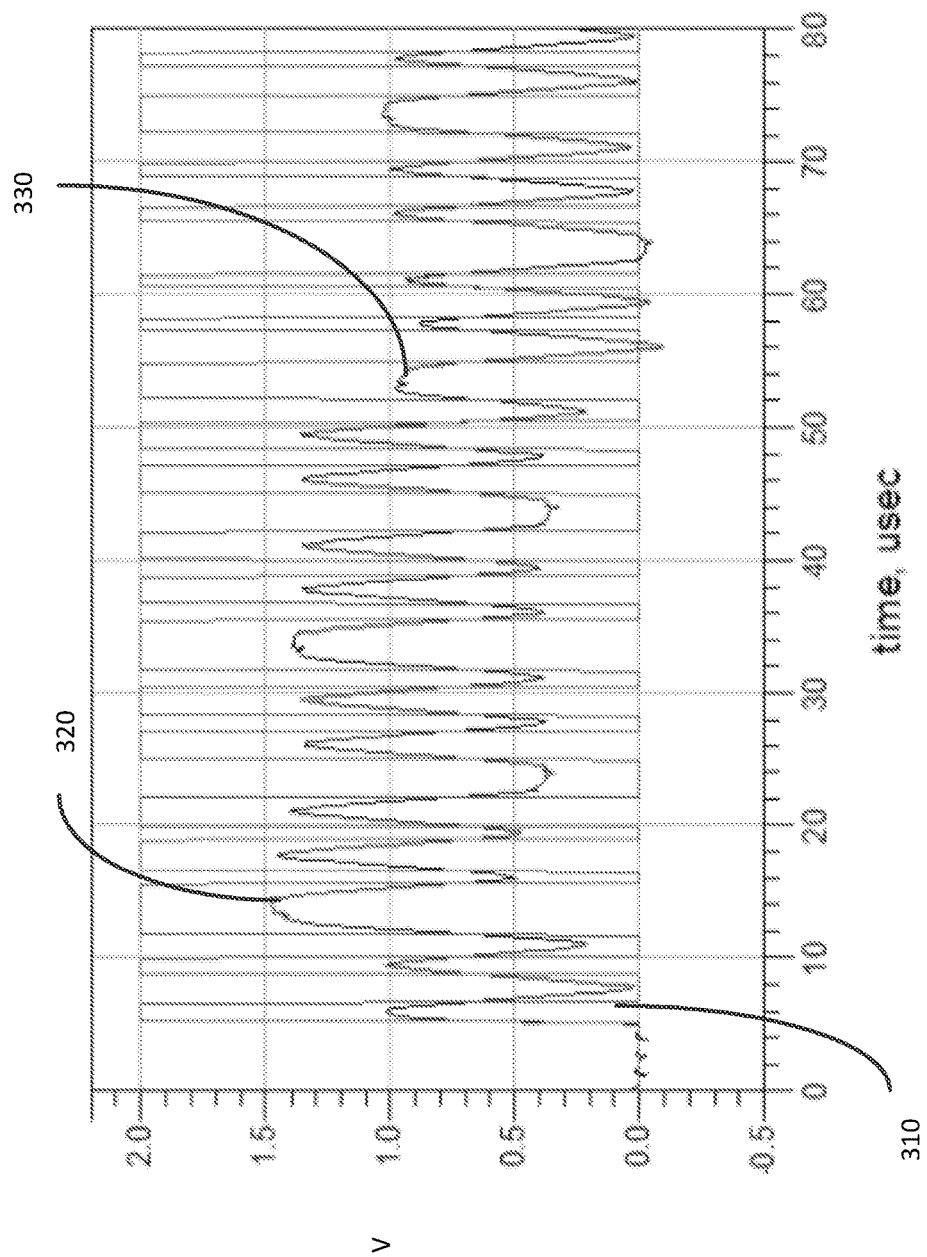
FIG. 3 illustrates an effect on a received signal caused by ground drift.

FIG. 3 illustrates an effect on a received signal caused by ground drift. In this example, a transmitting device is acting as a power source. A large current may be provided starting at about 10 usec. This may cause a DC component of received waveform 310 to increase to a higher level at 320. As the current is reduced at about 50 usec, the DC component of received waveform 310 may decrease to a lower level at 330.

Figure 4:
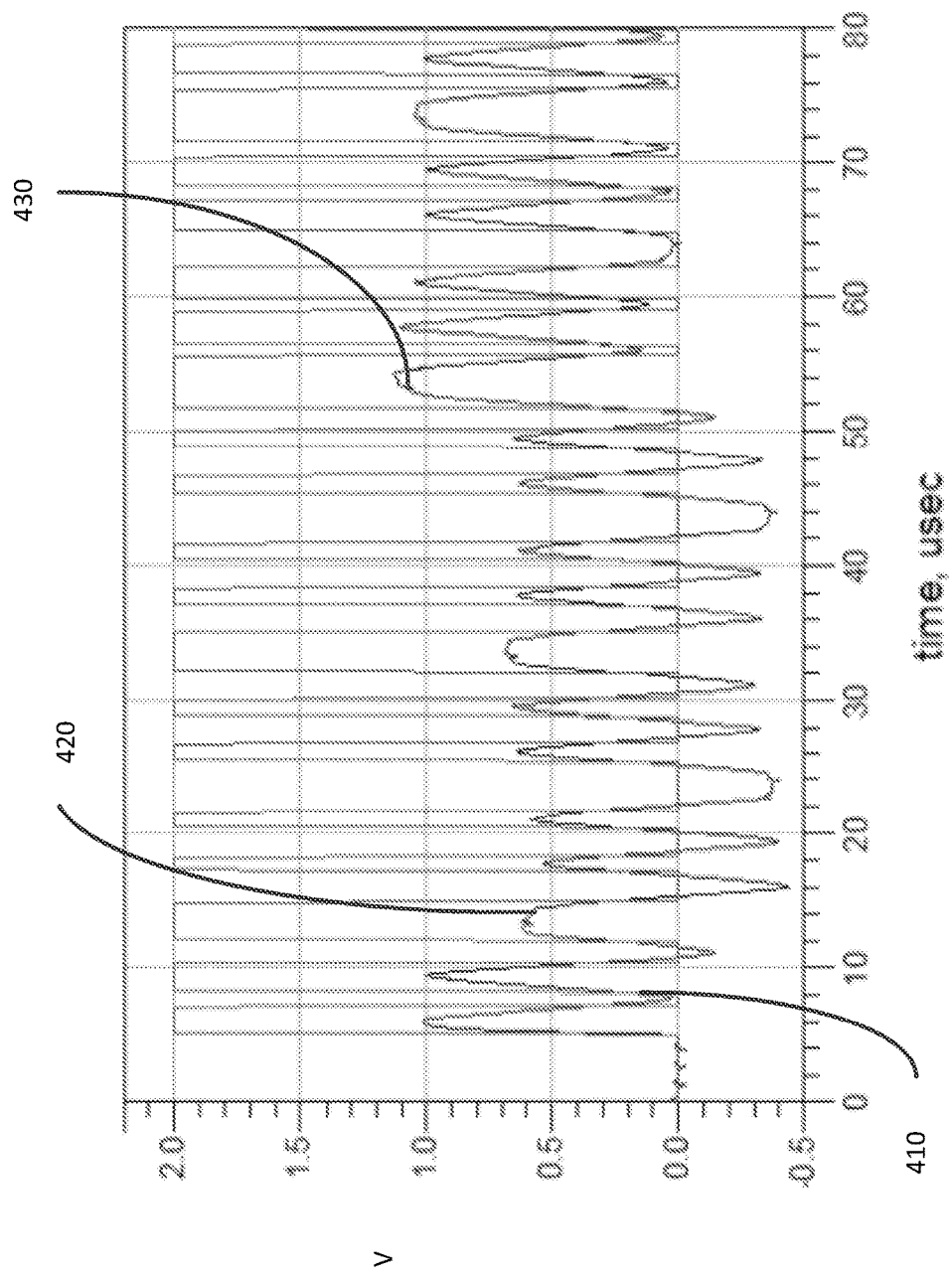
FIG. 4 illustrates an effect on a received signal caused by ground drift.

FIG. 4 illustrates an effect on a received signal caused by ground drift. In this example, a transmitting device is acting as a power sink. A large current may be received starting at about 10 usec. This may cause a DC component of received waveform 410 to decrease to a lower level at 420. As the current is reduced at about 50 usec, the DC component of received waveform 410 may increase to a higher level at 430.

Figure 5:
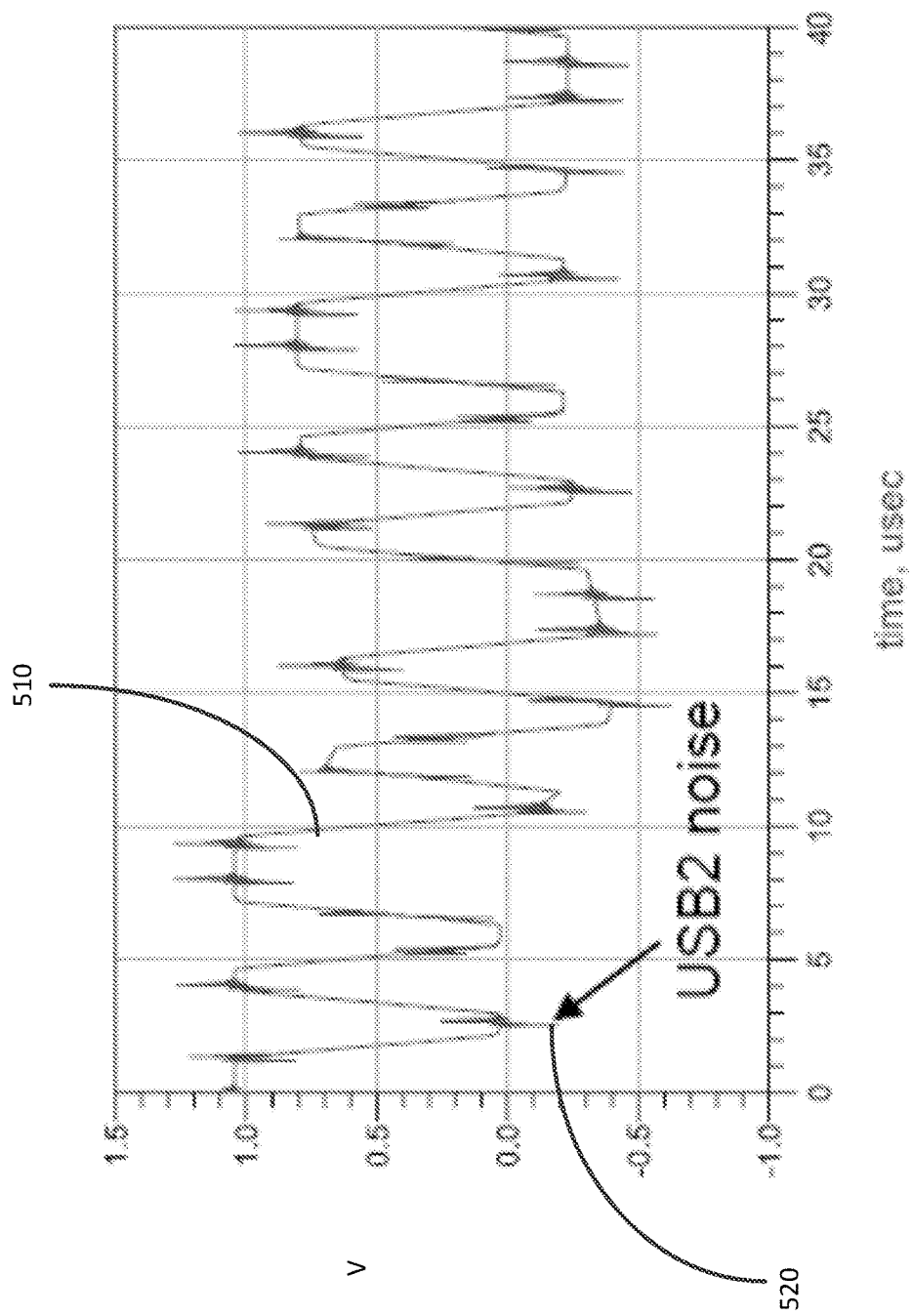
FIG. 5 illustrates an effect on a received signal caused by coupling from a high-frequency signal.

FIG. 5 illustrates an effect on a received signal caused by coupling from a high-frequency signal. In this example, the high-frequency signal is a USB2 signal. This signal may capacitively couple from the USB2 signal conductors to the conductor conveying the CC signal. Specifically, the USB2 signal may couple as noise 520 on received data signal 510. This coupling may degrade the received data signal and make accurate recovery of the data more difficult.

Not illustrated but also often present is an effect on a received signal caused by inductive coupling from a power supply or other signal. Noise on a power supply conductor in a cable may inductively couple to the CC signaling conductor. This coupling may be caused by the mutual inductance between conductors in a cable. In various embodiments, power supply noise on a VBUS conductor couples to the CC signaling conductor.

Figure 6:
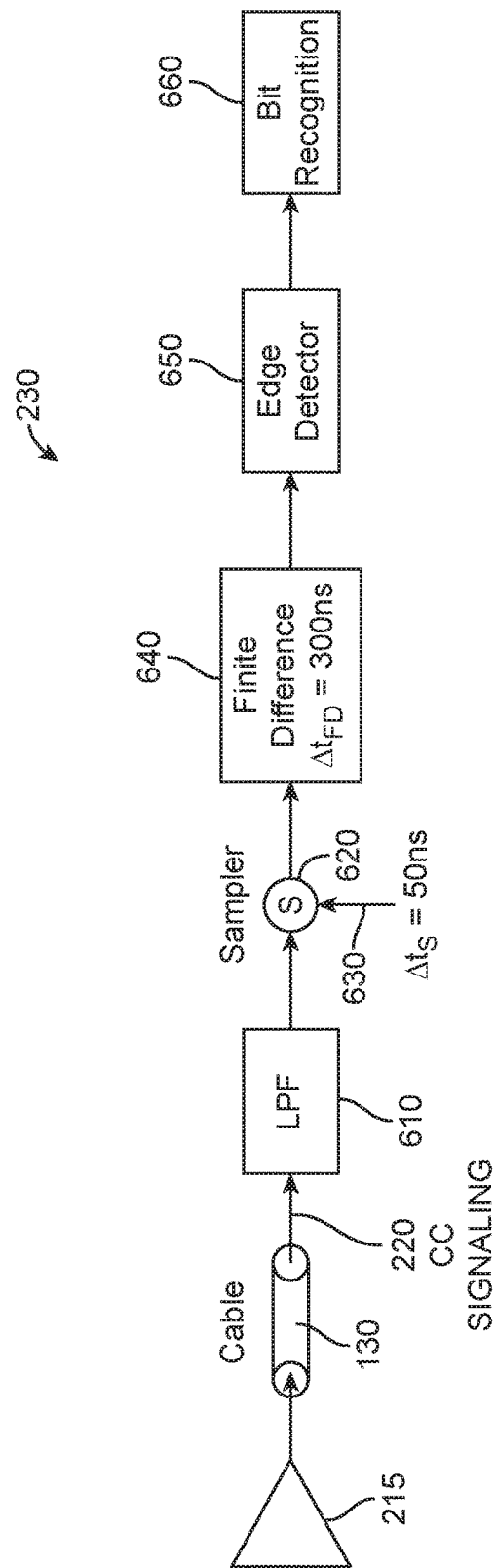
FIG. 6 illustrates a data transfer path according to an embodiment of the present invention.

FIG. 6 illustrates a data transfer path according to an embodiment of the present invention. Again, transmitter 215 may transmit data to receiver 230 via cable 130. Receiver 230 may include a low-pass filter 610 to receive data from the CC signaling pin 220. This low-pass filter may remove some of the high-frequency coupling components, which may couple from other signals and are associated with the connector, such as a USB2 signal pair. Sampler 620 may sample the output of low pass filter 610 at a rate that is determined by an input signal received on line 630. In one example, the samples may be taken every 25, 50, 100, or 200 ns, or the samples may be taken at a different interval. Sampler 620 maybe a sample and hold circuit or other type of circuit. Finite-difference circuitry 640 may subtract samples spaced a first duration apart from each other, and then divide that difference by the first duration. In various embodiments of the present invention, this first duration may be 100, 200, 300, 400, or 500 ns, or the first duration may have another value. The output of the finite-difference circuit 640 may be an approximation of a derivative of the signal received by the low-pass filter 310. Low-pass filter 610, sampler 620, and finite-difference circuit 640 may be considered to be a processing circuit used to generate a finite difference of the data signal received at CC signaling pin 220 by the low-pass filter 610.

A finite difference of a rising edge of a signal is a positive peak, while the finite difference of a falling edge of a signal is a negative peak. Accordingly, these positive and negative peaks of the output signal of the finite-difference circuit may be used to determine locations of edges of the received data signal. Accordingly, an output of the finite-difference circuit 640 may be connected to edge detector 650. Edge detector 650 may, for example, use two comparators, one having a positive (or high) threshold voltage and a second having a negative (or low) threshold voltage to determine the location of positive and negative peaks, and therefore the rising and falling edges of the received signal. Once locations of the edges are located, the received signal may be decoded by bit recognition circuit 650. For example, the edges may be used to trigger a set-reset flip-flop. A positive edge may set the flip-flop to a "1" state while a negative edge may reset the flip-flop to a '0" state. The output of the flip-flop may be the reconstructed received data signal. A phase-locked loop, delay-locked loop, or other circuit may be used to reduce noise and jitter of the received signal. Examples of waveforms through this signal path are shown in the following figures.

Figure 7:
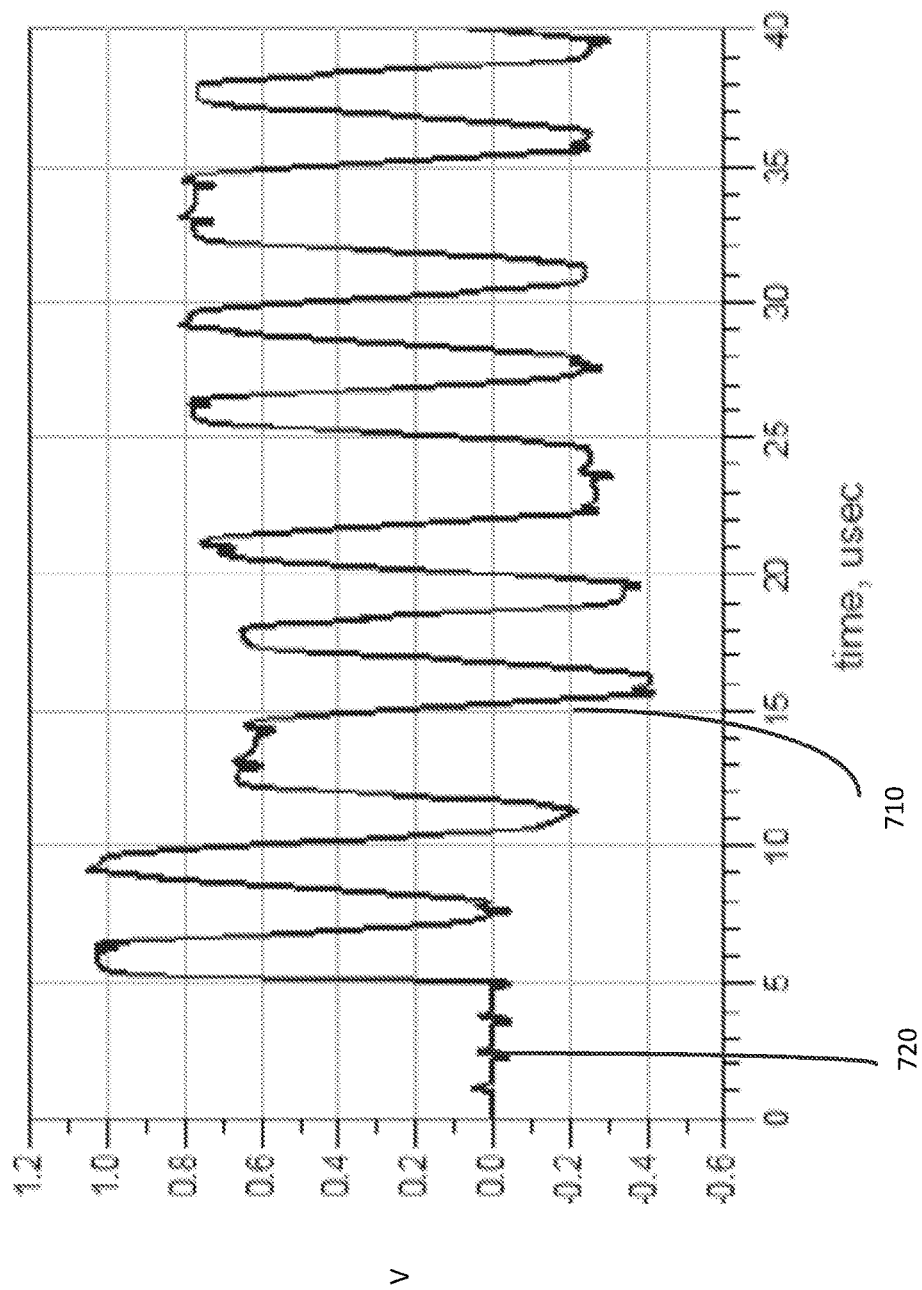
FIG. 7 illustrates an output of low-pass filter 610 in the receiving circuitry of FIG. 6.

FIG. 7 illustrates an output of low-pass filter 610 in the receiving circuitry of FIG. 6. Waveform 710 illustrates a received data signal in the presence of ground drift and high-frequency noise components 720.

Figure 8:
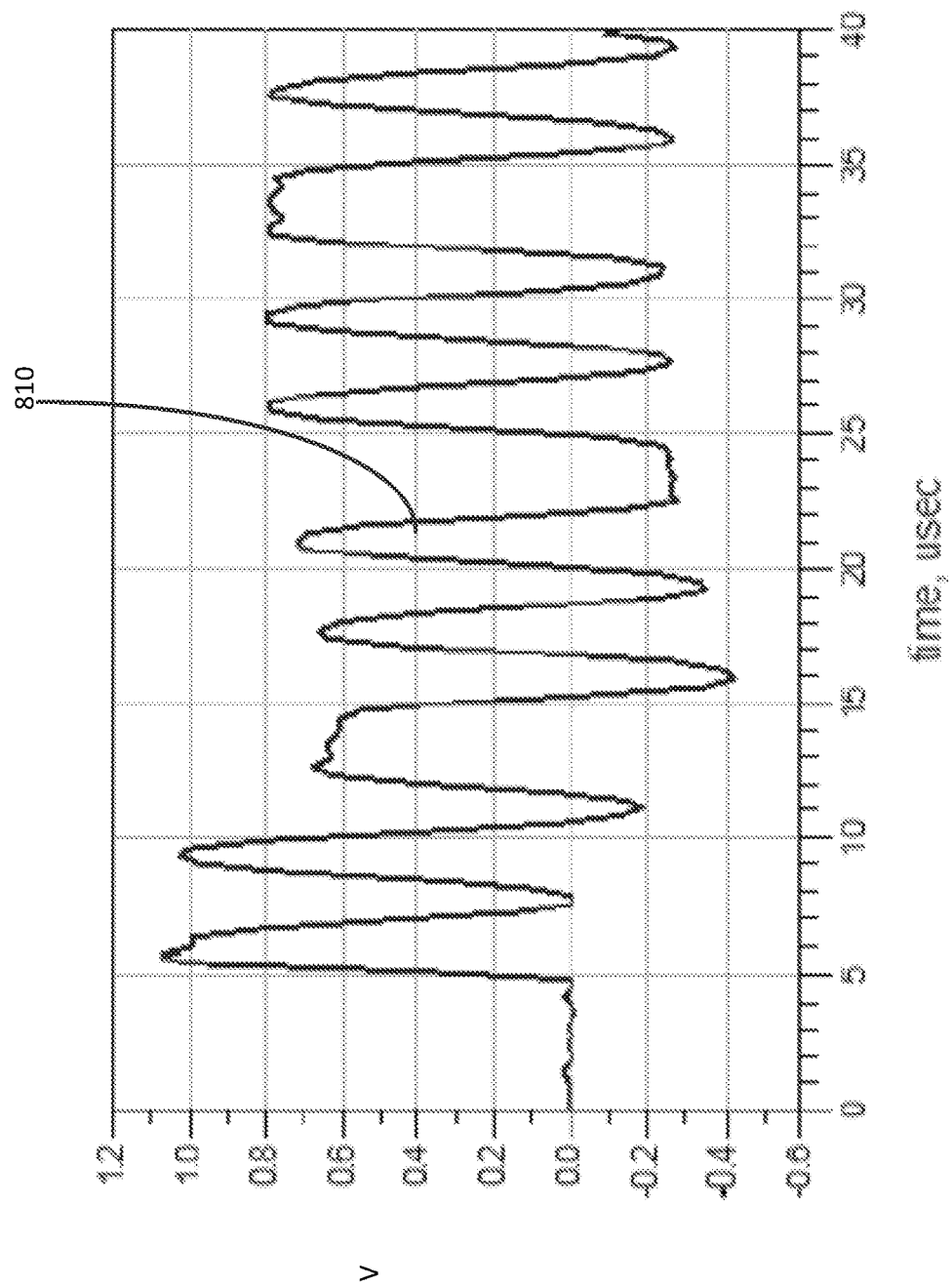
FIG. 8 illustrates an output of sampler 620 in the receiving circuitry of FIG. 6.

FIG. 8 illustrates an output of sampler 620 in the receiving circuitry of FIG. 6. As can be seen, waveform 810 is substantially free of high-frequency coupling components. The finite difference of this signal may be taken by finite-difference circuit 630 in FIG. 6. An example is shown in the following figure.

Figure 9:
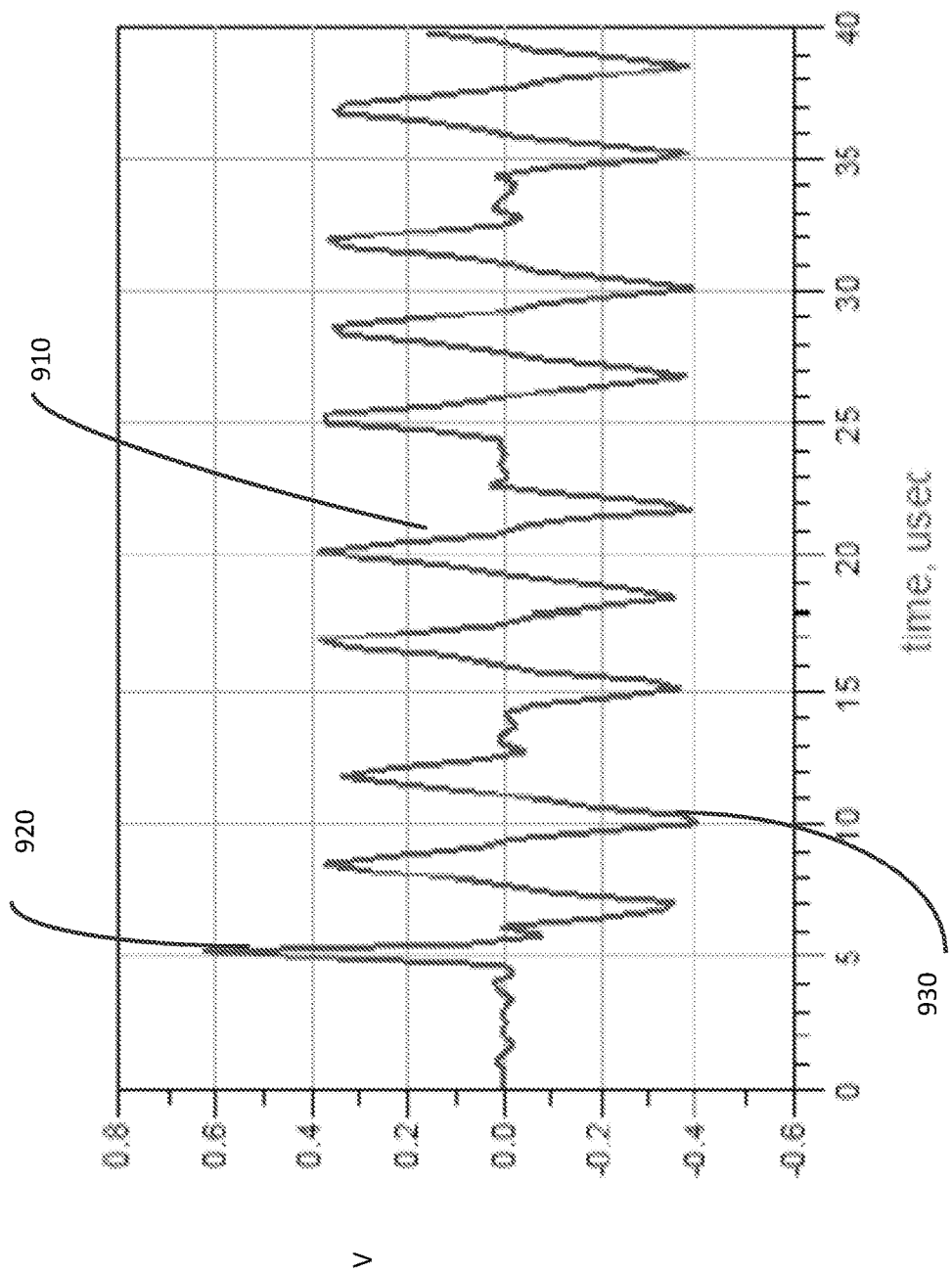
FIG. 9 illustrates a finite difference of the waveform of FIG. 8.

FIG. 9 illustrates a finite difference of the waveform of FIG. 8. Again, waveform 910 may be generated by the finite-difference circuit 640 in FIG. 6. A finite difference of a rising edge is a positive peak, such as peak 920. A finite difference of a falling edge of a received signal is a negative peak, such as peak 930. By comparing levels of signal 910 to a positive (or high) threshold voltage and a negative (or low) threshold voltage, the location of these rising and falling edges may be reconstructed. These edges may be used to reconstruct the received data signal. For example, positive peaks 920 may trigger a first comparator which may set an RS flip-flop to a one state, while negative peaks 930 may trigger a second comparator which may reset the RS flip-flop to a zero state.

Figure 10:
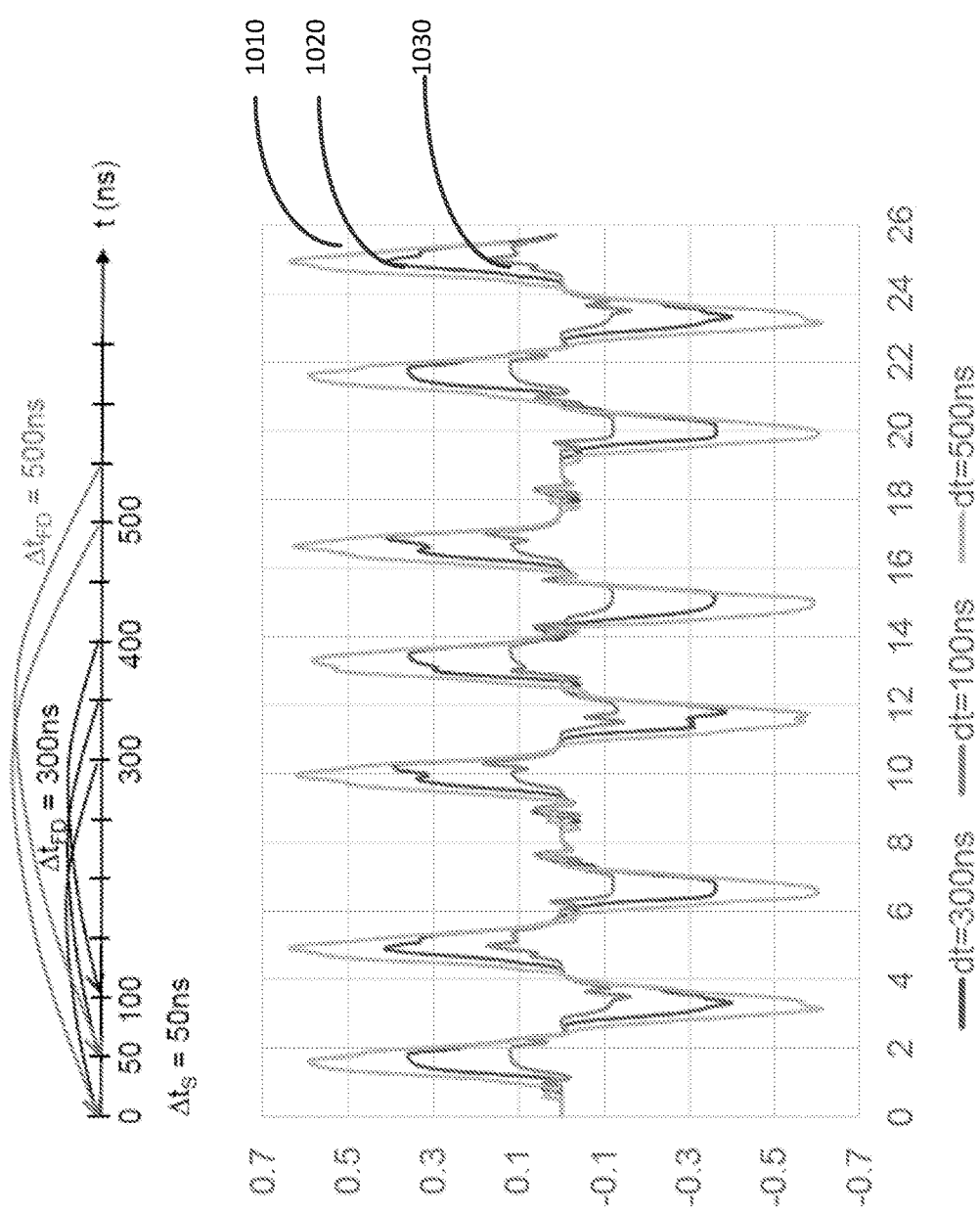
FIG. 10 illustrates variations in the finite difference of the waveform of FIG. 8 as a function of duration between samples used in calculating difference values.

FIG. 10 illustrates variations in the finite difference of the waveform of FIG. 8 as a function of duration between samples used in calculating difference values. In this example, larger durations between samples used to calculate differences may result in larger amplitudes. In each of these waveforms, data is sampled every 50 nsec. Finite difference values are then calculated between samples that are spaced 100 (waveform 1010), 300 (waveform 1020), and 500 (waveform 1030) nsec apart. The finite differences having larger durations between samples yields larger amplitudes.

Again, a finite difference of a signal may be used as an approximation for a derivative of that signal. But it may be undesirable to utilize an actual derivative. Examples showing why are shown in the following figures.

Figure 11:
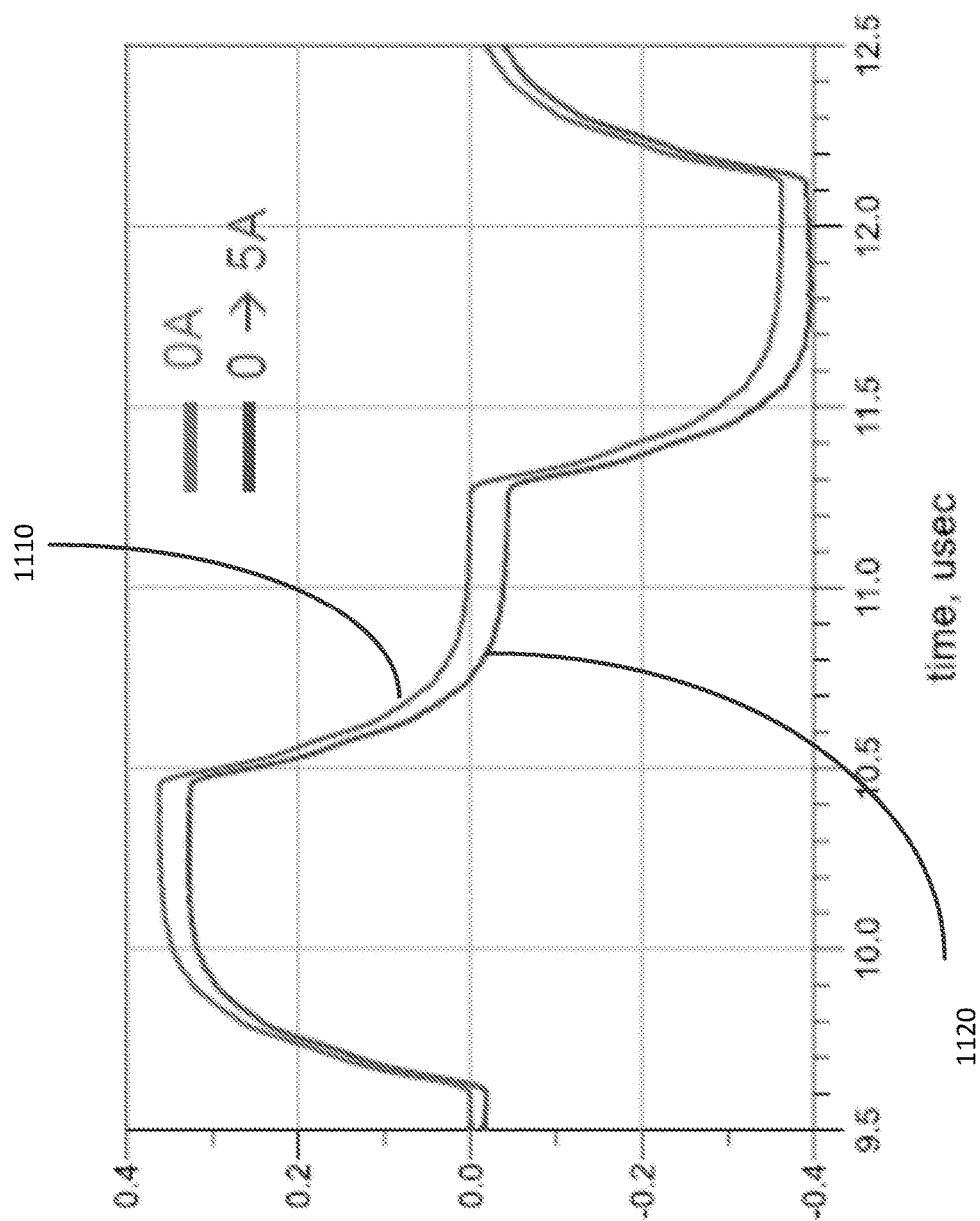
FIG. 11 illustrates a derivative of a portion of a received signal in the absence of high-frequency coupling.

FIG. 11 illustrates a derivative of a portion of a received signal in the absence of high-frequency coupling. As can be seen, in the absence of noise, a derivative of the received signal is a useful signal in reconstructing the received data signal. The waveforms 1110 and 1120 are derivatives of received data signals without high-frequency coupling and in the presence (1120) and absence (1110) of ground drift.

Figure 12:
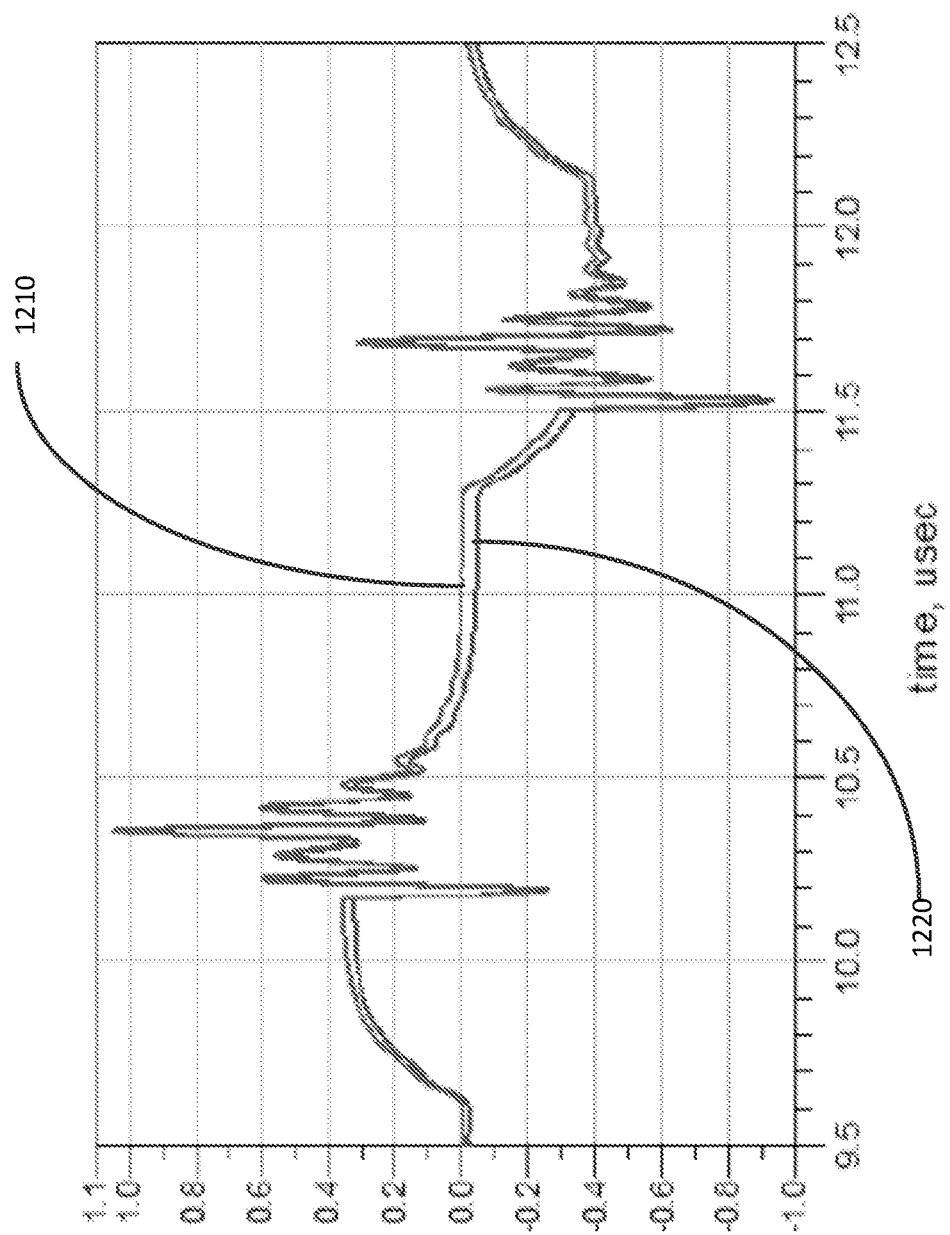
FIG. 12 illustrates a derivative of a portion of a received signal in the presence of high-frequency coupling.

FIG. 12 illustrates a derivative of a portion of a received signal in the presence of high-frequency coupling. As shown, the derivative of the coupling components on the received signal may make a derivative of the received signal useless, or nearly so, in reconstructing the received data signal. The waveforms 1210 and 1220 are derivatives of received data signals with high-frequency coupling and in the presence (1220) and absence (1210) of ground drift.

Figure 13:
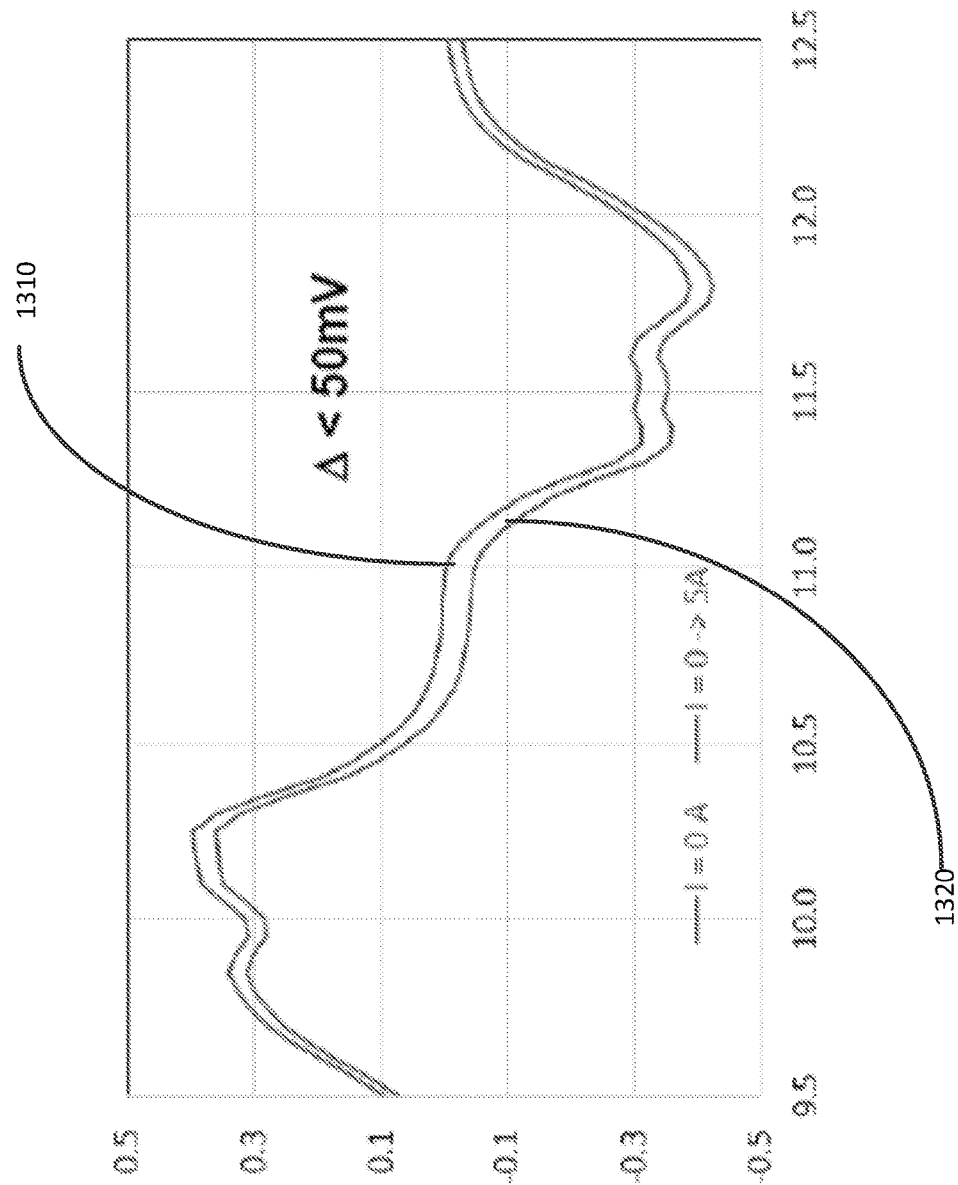
FIG. 13 illustrates a finite difference of a received signal in the presence of noise.

FIG. 13 illustrates a finite difference of a received signal in the presence of noise. As can be seen, a finite difference of the received signal is a useful signal in reconstructing the received data signal. The waveforms of FIG. 13 may be used to reconstruct the received data signal even in the presence of noise in a manner consistent with an embodiment of the present invention. The waveforms 1310 and 1320 are finite differences of received data signals with high-frequency coupling and in the presence (1310) and absence (1320) of ground drift.

Other types of circuitry may be used to recover a received data signal in other embodiments of the present invention. An example is shown in the following figure.

Figure 14:
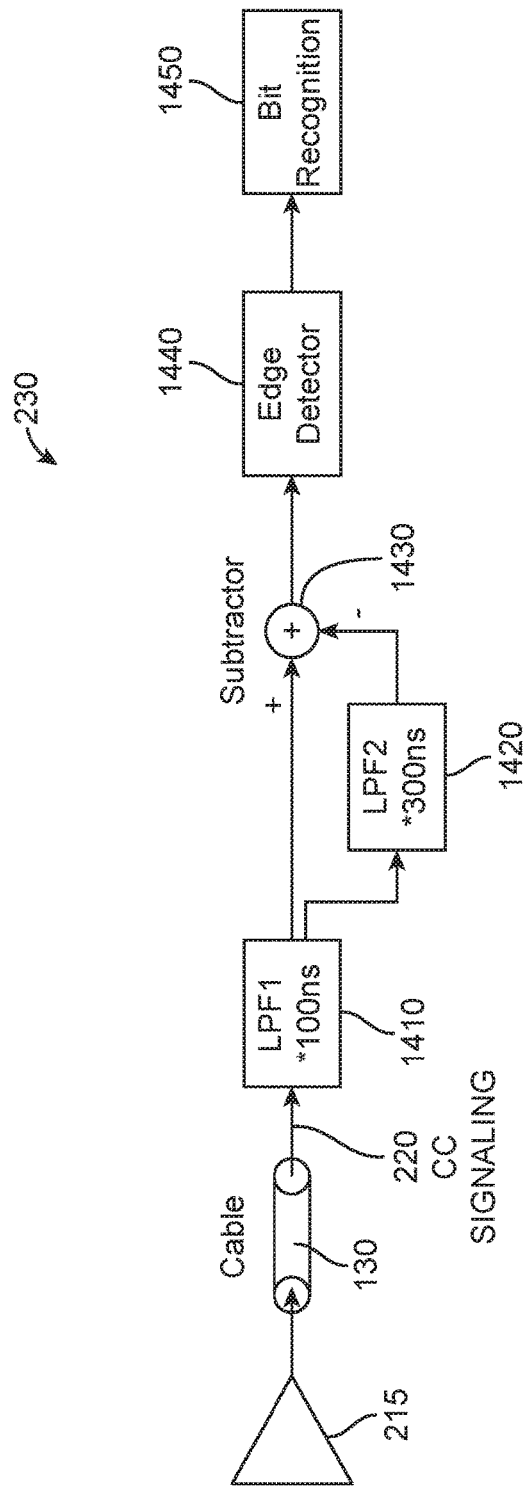
FIG. 14 illustrates a data recovery circuit according to an embodiment of the present invention.

FIG. 14 illustrates a data recovery circuit according to an embodiment of the present invention. As before, transmitter 215 may transmit signals to receive circuitry 230. Receive circuitry 230 may include as before, a low-pass filter 1410. An output of low-pass filter 1410 may be filtered by second low-pass filter 1420. In various embodiments of the present invention, the second low-pass filter 1420 may be a delay circuit. The difference between the outputs of these low-pass filters may be taken by subtractor 1430. Subtractor 1430 may perform a finite-difference function. Subtractor 1430 may thus generate a finite difference of the data signal received by the first low-pass filter 1410. The first low-pass filter 1410, the second low-pass filter 1420, and the subtractor 1430 may be considered to be a processing circuit that generates an approximation of a derivative of the data signal received at the first filter 1410. As before, the output of the finite-difference circuit, in this case subtract 1430, may be received by an edge detector 1440. An output of edge detector 1440 may be provided to an input of bit recognition circuit 1450.

In various embodiments of the present invention, the processing circuit may provide a phase shift in the frequency range relative to the data edge rate. This may provide a phase shift of a desirable amount, where a lower phase shift may generate an increased amount of noise. In one embodiment, a fastest edge may have a duration of 300 ns. For this reason, the phase shift of the second low-pass filter may be 300 ns in duration.

In this specific implementation, outputs of two low-pass filters are subtracted. This may be one way of generating a high-pass filter. Specifically, the transfer function of a low pass is $1/(1+RCS)$. If this is subtracted from unity, the transfer function becomes $1-1/(1+RCS)=RCS/(1+RCS)$, which is the transfer function of a high-pass filter. This high-pass filtering may be implemented in various ways consistent with embodiments of the present invention. Waveforms illustrating these functions are shown in the following figures.

Figure 15:
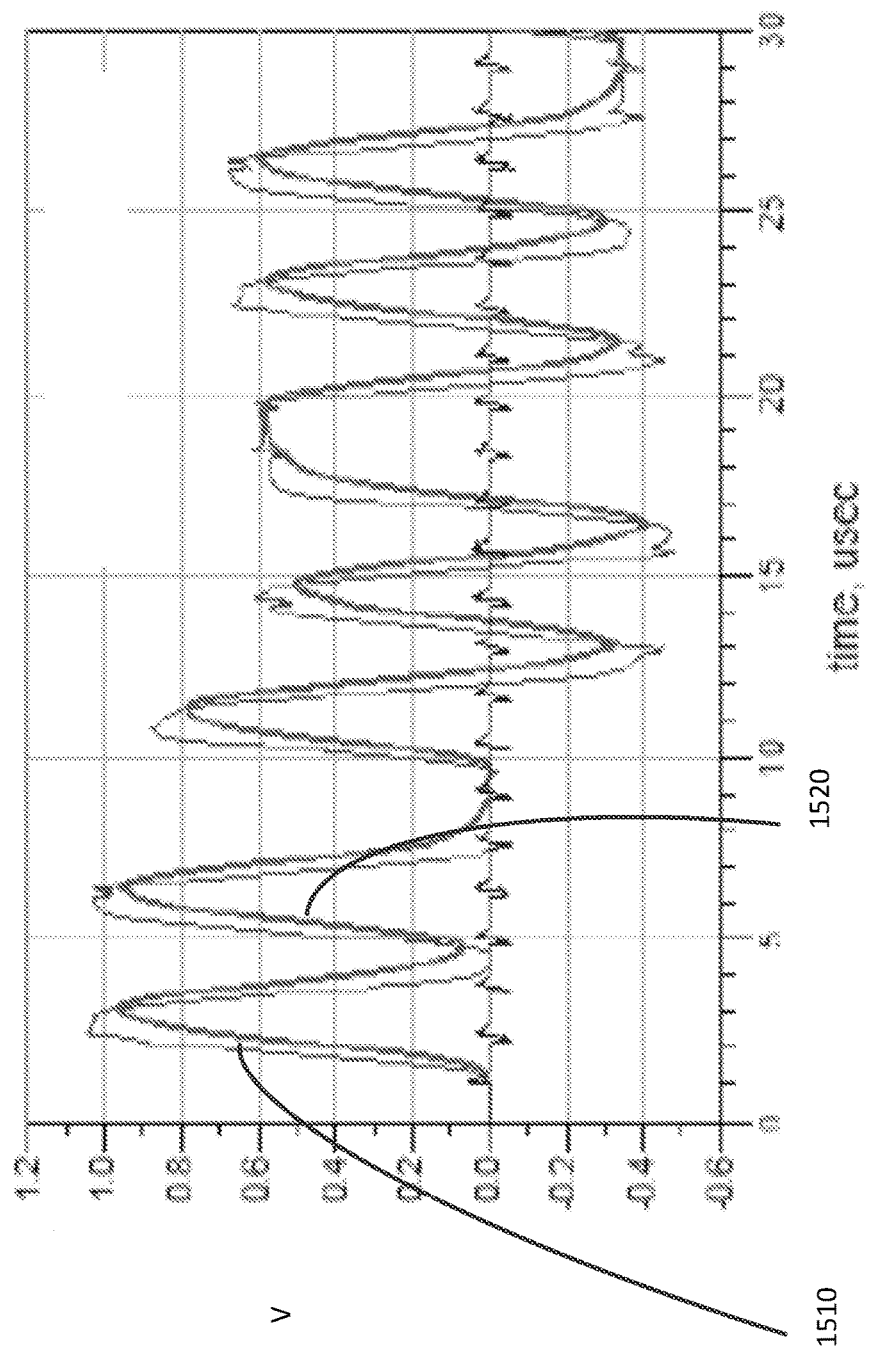
FIG. 15 illustrates the output of the first and second low-pass filters 1410 and 1420 in the data recovery circuit of FIG. 14.

FIG. 15 illustrates outputs of the first and second low-pass filters 1410 and 1420 in the data recovery circuit of FIG. 14. The first low-pass filter may provide waveform 1510, while the second low pass filter may provide a delayed signal waveform 1520. A difference between these signals may be generated and used as a finite difference of the data signal received by the first low-pass filter 1510.

Figure 16:
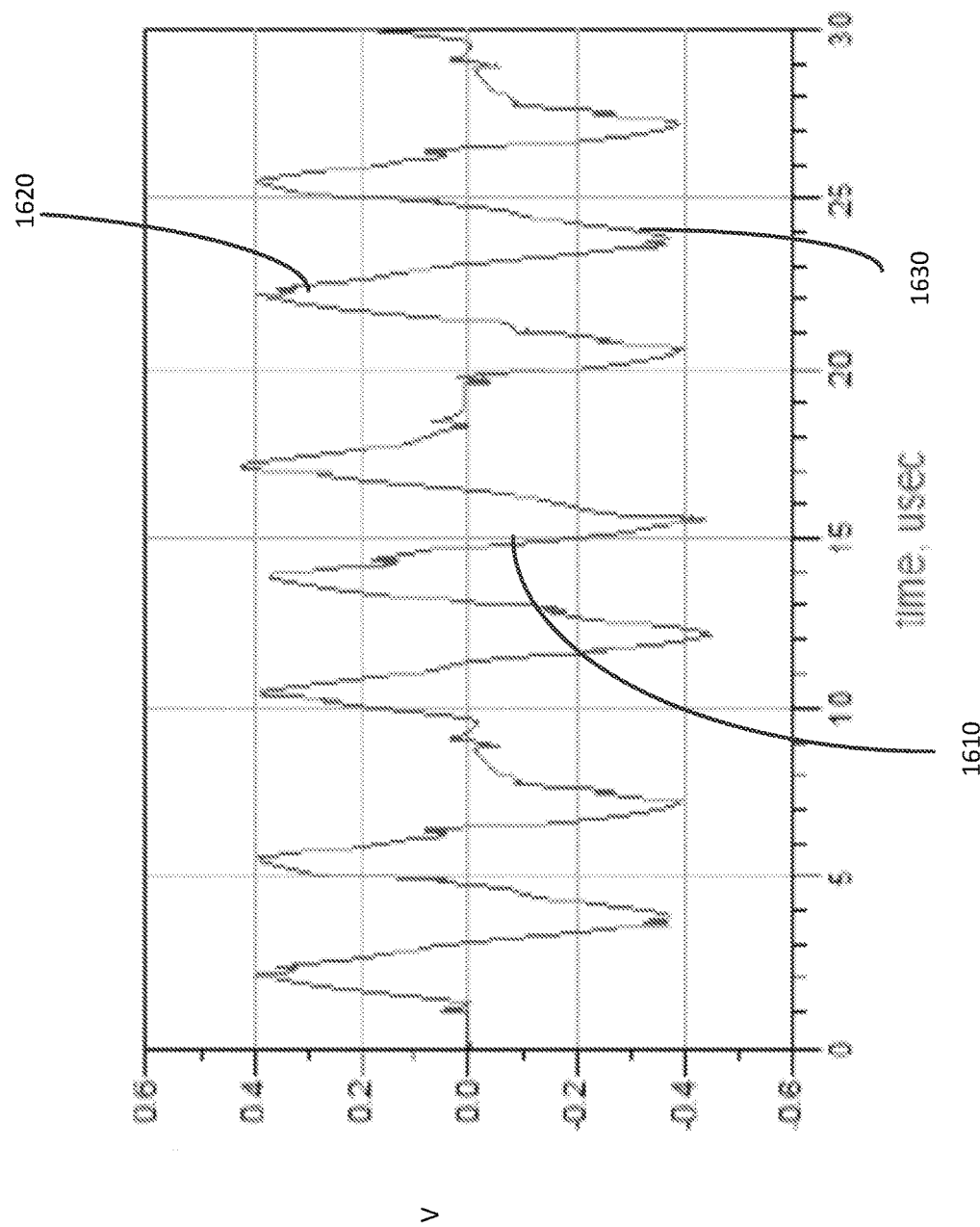
FIG. 16 illustrates a difference signal between the output of the first low-pass filter 1410 and the output of the second low-pass filter 1420 in the receive circuitry of FIG. 14.

FIG. 16 illustrates a difference signal between the output of the first low-pass filter 1410 and the output of the second low-pass filter 1420 in the receive circuitry of FIG. 14. As before, a finite difference of a rising edge of a data signal may be a positive peak such as peak 1620, while a finite difference of a falling edge may be a negative peak such as peak 1630.

Figure 17:
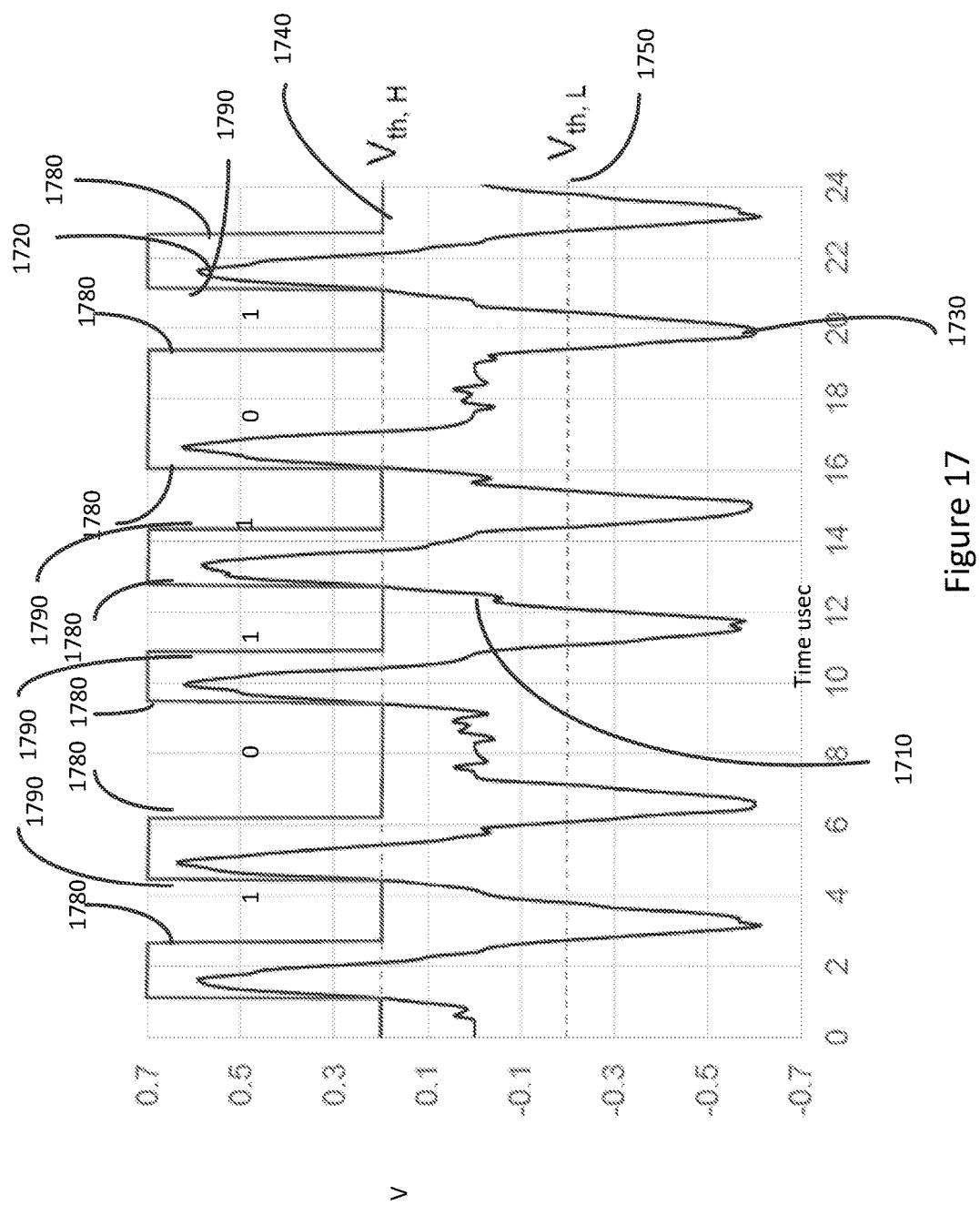
FIG. 17 illustrates a difference signal between the output of the first low-pass filter 1410 and the output of the second low-pass filter 1420 in the receive circuitry of FIG. 14.

FIG. 17 illustrates a difference signal between the output of the first low-pass filter 1410 and the output of the second low-pass filter 1420 in the receive circuitry of FIG. 14. As before, a finite difference of a rising edge of a data signal may be a positive peak such as peak 1720, while a finite difference of a falling edge may be a negative peak such as peak 1730.

These positive and negative peaks may be compared to a first threshold 1740 and a second threshold 1750. When the output waveform 1710 exceeds the first threshold 1740, a rising edge maybe detected, and when a negative peak of waveform 1010 falls below a second threshold 1750, a falling edge may be detected. As before, these rising and falling edges may be used to reconstruct the data signal received at the input of the first low-pass filter 1410 in FIG. 14.

Again, in Manchester or bi-phase marked coding, every bit boundary 1780 may have an edge. Ones may have a mid-bit edge 1790, while a zero may remain at its current value throughout the bit time. This edge information may be recovered from the positive and negative peaks 1720 and 1730. For example, a positive peak 1720 may correspond to a rising edge of the data while a negative peak 1730 may correspond to a falling edge of the data. A first comparator that compares waveform 1710 to the high threshold 1740 may be used to identify rising edges. A second comparator that compares waveform 1710 to the low threshold 1750 may be used to identify falling edges. From these edges, the ones and zeros of the received data may be recovered.

In these and other embodiments of the present invention, a phase-locked loop (PLL), delay-locked loop (DLL) or other circuit may be used to clean-up the recovered data signal to improve the accuracy of its decoding. These circuits may be used to reduce noise associated with the locations of the edges of the recovered data signal. This clean-up may be facilitated by the use of a preamble of bits having alternating polarities. In various embodiments of the present invention, this preamble may be approximately 64 bits long. This clean-up of the data may also be facilitated by the nature of Manchester or bi-phase marked coding. Specifically, these protocols utilize edges on every bit boundary, where a one has an additional edge in the bit center while a zero does not have such an additional edge. This means data can be recovered from the logic ones and zeros from the edge information by leveraging known phase and frequency of the bit rate, and that this recovery may be further facilitated by the relatively high number of data transitions in the implemented coding scheme.

One or more of the various parameters may be programmable. For example, the first and second threshold voltages used in recovering edges, such as threshold voltages 1740 and 1750, may be programmable. The bandwidths of the various filters, such as filters 610, 1410, and 1420, may be programmable. The delay of a delay circuit that may be used in place of low-pass filter 1420 may be programmable. The sampling rates and time differences used by sampler 620 and finite-difference circuit 640 may be programmable.

Various types of data may be recovered using embodiments of the present invention. For example, Manchester or bi-phase marked coding encoded data and other types of data may be recovered using embodiments of the present invention.

Embodiments of the present invention may provide data recovery circuits that may be used in various types of devices, such as lighting, portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices. These receivers may enable the use of longer routing paths that may be useful for smoke alarms, routers, sensors, cameras, and other applications. These receivers may be used with connector receptacles that may provide pathways for signals and power compliant with various standards such as one of the Universal Serial Bus standards including USB Type-C, High-Definition Multimedia Interface, Digital Visual Interface, Ethernet, DisplayPort, Thunderbolt, Lightning, Joint Test Action Group test-access-port, Directed Automated Random Testing, universal asynchronous receiver/transmitters, clock signals, power signals, and other types of standard, non-standard, and proprietary interfaces and combinations thereof that have been developed, are being developed, or will be developed in the future.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of recovering data in a data signal, the method comprising:
   receiving the data signal with a receiving circuit and providing a received data signal;
   with a finite-difference circuit, generating a finite difference of the received data signal by delaying the received data signal to generate a delayed received data signal, and taking a difference between the received data signal and the delayed received data signal;
   with an edge detector, detecting edges of the received data signal by detecting positive and negative peaks of the finite difference of the received data signal; and
   with a data reconstruction circuit, recovering data in the data signal using the detected edges.

2. The method of claim 1 wherein the data signal is a bi-phase marked coding encoded signal.

3. The method of claim 1 wherein the data signal is received on a Configuration Channel (CC) pin of a Universal Serial Bus Type-C connector.

4. The method of claim 3 wherein the finite difference is generated using a finite-time difference method.

5. The method of claim 3 wherein the receiving circuit comprises a first filter, the received data signal is generated by filtering the data signal with the first filter, and the finite difference of the received data signal is generated by filtering an output of the first filter with a second filter and taking a difference between the received data signal output by the first filter and the delayed received data signal output by the second filter.

6. The method of claim 5 wherein taking the difference between the received data signal output by the first filter and the delayed received data signal output by the second filter comprises subtracting the output of the second filter from the output of the first filter.

7. The method of claim 3 wherein detecting edges of the received data signal by detecting positive and negative peaks of the finite difference of the received data signal comprises detecting a rising edge by detecting a positive peak of the finite difference of the received data signal and detecting a falling edge by detecting a negative peak of the finite difference of the received data signal.

8. The method of claim 7 wherein detecting a positive peak of the finite difference of the received data signal comprises detecting that the finite difference of the received data signal exceeds a high threshold voltage and detecting a negative peak of the finite difference of the received data signal comprises detecting that the finite difference of the received data signal is below a low threshold voltage.

9. The method of claim 8 further comprising using the detected rising edges and the detected falling edges to reconstruct the received data signal.

10. A receiver for recovering data comprising:
an input pin to receive a data signal;
a receiving circuit to receive the data signal and to provide a received data signal;
a finite-difference circuit coupled to the receiving circuit to receive the received data signal, delay the received data signal to generate a delayed received data signal, and generate a finite difference of the received data signal by taking a difference between the received data signal and the delayed received data signal;
an edge detector coupled to an output of the finite-difference circuit to detect positive and negative peaks of the finite difference of the received data signal; and
a data reconstruction circuit coupled to an output of the edge detector to recover data in the data signal using the detected edges.

11. The receiver of claim 10 wherein the receiving circuit comprises a first low-pass filter.

12. The receiver of claim 11 further comprising:
a sampling circuit coupled to an output of the first low-pass filter and an input of the finite-difference circuit.

13. The receiver of claim 12 wherein the finite-difference circuit comprises:
a second low-pass filter coupled to an output of the sampling circuit; and
a subtraction circuit coupled to take a difference between the output of the sampling circuit and an output of the second low-pass filter.

14. The receiver of claim 10 wherein the edge detector comprises:
a first comparator to detect when an output of the finite-difference circuit exceeds a first threshold voltage; and
a second comparator to detect when an output of the finite-difference circuit falls below a second threshold voltage.

15. An electronic device comprising:
a connector receptacle having an input pin to receive a data signal; and
a receiver coupled to the input pin, the receiver comprising:
a first low-pass filter to receive the data signal and provide a received data signal;
a finite-difference circuit coupled to the first low-pass filter, the finite-difference circuit to generate a finite difference of the received data signal, the finite-difference circuit comprising a second low-pass filter to filter the received data signal to generate a delayed received data signal, and a subtractor to take a difference between the received data signal and the delayed received data signal;
an edge detector coupled to an output of the finite-difference circuit to detect positive and negative peaks of the finite difference of the received data signal; and
a data reconstruction circuit coupled to an output of the edge detector to recover data in the data signal using the detected edges.

16. The electronic device of claim 15 wherein the first low-pass filter provides a delay of approximately 100 ns and the second low-pass filter provides a delay of approximately 300 ns.

17. The electronic device of claim 15 further comprising:
a sampling circuit coupled to an output of the first low-pass filter and an input of the finite-difference circuit.

18. The electronic device of claim 15 wherein the edge detector comprises:
a first comparator to detect when an output of the finite-difference circuit exceeds a first threshold voltage; and
a second comparator to detect when the output of the finite-difference circuit falls below a second threshold voltage.

19. The electronic device of claim 15 wherein the connector receptacle is a Universal Serial Bus Type-C connector receptacle and the input pin is a Configuration Channel (CC) pin.

* * * * *